United States Patent [19]
Hara et al.

[11] Patent Number: 5,738,448
[45] Date of Patent: Apr. 14, 1998

[54] RIBBON CASSETTE FOR PRINTER

[75] Inventors: Kozo Hara; Hajime Yamamoto, both of Tagata, Japan

[73] Assignee: Kabushiki Kaisha Tec, Shizuoka, Japan

[21] Appl. No.: 652,415

[22] Filed: May 23, 1996

[30] Foreign Application Priority Data

May 26, 1995 [JP] Japan ................................. 7-126956

[51] Int. Cl.$^6$ ................................. B41J 33/14; F16D 9/00
[52] U.S. Cl. ........................... 400/231; 400/208; 464/32
[58] Field of Search ........................... 400/236, 236.2, 400/223, 231, 208; 404/32; 403/2

[56] References Cited

U.S. PATENT DOCUMENTS

| | | | |
|---|---|---|---|
| 2,472,046 | 11/1949 | Potter | 462/32 |
| 2,889,162 | 2/1959 | Norris | 464/32 |
| 2,892,329 | 9/1959 | Trigilio | 464/32 |
| 3,359,171 | 12/1967 | Hanke | 464/32 |
| 3,753,625 | 8/1973 | Fabrizio et al. | 408/239 |
| 4,513,563 | 4/1985 | Roser et al. | 56/295 |
| 5,071,376 | 12/1991 | Walker | 440/49 |
| 5,096,315 | 3/1992 | Yamamoto et al. | 400/221.2 |
| 5,145,213 | 9/1992 | Marrison et al. | 285/2 |

FOREIGN PATENT DOCUMENTS

| | | | |
|---|---|---|---|
| 2420515 | 4/1975 | Germany | 464/32 |
| 63-201750 | 12/1988 | Japan. | |
| 2-8961 | 1/1990 | Japan. | |

*Primary Examiner*—Ren Yan
*Assistant Examiner*—Dave A. Ghatt
*Attorney, Agent, or Firm*—Oblon, Spivak, McClelland, Maier & Neustadt, P.C.

[57] ABSTRACT

Disclosed herein is a ribbon cassette for use with a printer, including a cassette case detachably mounted in the printer and an ink ribbon stored in the cassette case and partially exposed to face a print head provided in the printer. The ribbon cassette further includes a ribbon take-up member rotatably supported in the cassette case, a driven member rotatably supported in the cassette case and meshing with the ribbon take-up member through the ink ribbon, and a power transmitting member provided in the ribbon take-up member to connect the ribbon take-up member to a ribbon driving shaft provided in the printer. A breaking strength of the power transmitting member against a load from the ink ribbon is set smaller than that of the ribbon driving shaft. Accordingly, in the event that ribbon jam occurs, the power transmitting member breaks to thereby prevent fracture of the ribbon driving shaft in the printer.

7 Claims, 5 Drawing Sheets

RIBBON CASSETTE FOR PRINTER

BACKGROUND OF THE INVENTION

1. Field of the Invention

The present invention relates to a ribbon cassette for a printer, and more particularly to a structure for connecting a ribbon driving shaft in the printer and a ribbon take-up gear in the ribbon cassette.

2. Description of the Prior Art

FIG. 7 shows a prior art ribbon cassette having an endless ink ribbon 1 stored in a cassette case 2. The ink ribbon 1 is partially exposed from the cassette case 2 to face a print head (not shown) provided in a printer (not shown). As shown in FIG. 8, a ribbon take-up gear 3 as a ribbon take-up member and a driven gear 4 as a driven member meshing with each other through the ink ribbon 1 are rotatably provided in the cassette case 2. The opposite ends of the ribbon take-up gear 3 are exposed from the cassette case 2. When the cassette case 2 is set in the printer, one end of the ribbon take-up gear 3 is connected to a ribbon driving shaft 5 provided in the printer as shown in FIG. 9.

The problems in the prior art will now be described. As shown in FIG. 8, the ribbon take-up gear 3 has many teeth 3a over the outer circumference and the driven gear 4 also has many teeth 4a over the outer circumference. The ink ribbon 1 is sandwiched between the teeth 3a of the gear 3 and the teeth 4a of the gear 4. Accordingly, the ink ribbon 1 drawn from a position opposed to the print head by the rotation of the gears 3 and 4 is bent zigzag to be stored into the cassette case 2. As a result, there may occur ribbon jam due to crumpling of the ink ribbon 1 in the cassette case 2 or being caught of the ink ribbon 1 by any member in a ribbon traveling path during a long period of use. In a particular type of ribbon cassette having an ink pad for supplying ink to the ink ribbon 1 in the cassette case 2, the period of service of the ribbon cassette is greatly extended and the probability of occurrence of ribbon jam accordingly becomes high. In the event that ribbon jam occurs during print operation of the printer, the ink ribbon 1 becomes immovable to cause application of a high load to the ribbon take-up gear 3. If this load exceeds a given value, there is a possibility of fracture of the ribbon driving shaft 5 in the printer. In case of such fracture, the print operation cannot be continued and the printer must be repaired. Accordingly, a maintenance cost is increased.

Japanese Utility Model Laid-open No. 2-8961 discloses a printer having a structure that a ribbon driving shaft and its driving mechanism are connected through a spring clutch. Japanese Utility Model Laid-open No. 63-201750 discloses a printer having a structure that a power transmitting mechanism for transmitting the power of a motor to a ribbon driving shaft is provided with a spring clutch. According to these structures, even when ribbon jam occurs to cause the immovable state of an ink ribbon, the transmission of power to the ribbon driving shaft is cut by the spring clutch. Accordingly, even when the ink ribbon becomes immovable, no load is applied to the ribbon driving shaft, thereby preventing fracture of the ribbon driving shaft. However, since each of these prior art structures requires the spring clutch in the printer, the prevention of fracture of the ribbon driving shaft cannot be realized by using any existing printers. That is, a special printer having such a spring clutch must be newly constructed, and the existing printers cannot therefore be utilized. Furthermore, the requirement of the spring clutch causes a complication in structure and an increase in parts cost.

SUMMARY OF THE INVENTION

It is accordingly a first object of the present invention to provide a ribbon cassette for a printer which can prevent fracture of a ribbon driving shaft provided in the printer due to an excess load upon occurrence of ribbon jam.

It is a second object of the present invention to provide a ribbon cassette for a printer which can prevent the fracture of the ribbon driving shaft with a simple and low-cost structure.

According to the present invention, there is provided a ribbon cassette for use with a printer, comprising a cassette case adapted to be detachably mounted in the printer; an ink ribbon stored in the cassette case and partially exposed to face a print head provided in the printer; a ribbon take-up member rotatably supported in the cassette case; a driven member rotatably supported in the cassette case and meshing with the ribbon take-up member through the ink ribbon; and a power transmitting member provided in the ribbon take-up member to connect the ribbon take-up member to a ribbon driving shaft provided in the printer, a breaking strength of the power transmitting member against a load from the ink ribbon being set smaller than that of the ribbon driving shaft. With this structure, rotation of the ribbon driving shaft is normally transmitted through the power transmitting member to the ribbon take-up member during print operation of the printer. In the event that a high load is applied to the ribbon take-up member upon occurrence of ribbon jam, the power transmitting member breaks to thereby cut the transmission of power from the ribbon driving shaft to the ribbon take-up member. Therefore, fracture of the ribbon driving shaft due to the high load can be prevented upon occurrence of ribbon jam.

DETAILED DESCRIPTION OF THE PREFERRED EMBODIMENTS

Figure 1:
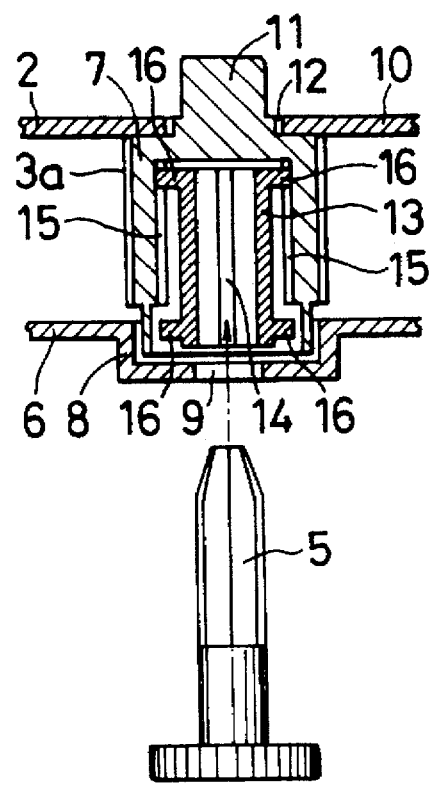
FIG. 1 is a vertical sectional view showing the relation between a ribbon driving shaft, a power transmitting member, and a ribbon take-up gear in a first preferred embodiment of the present invention.
Figure 2:
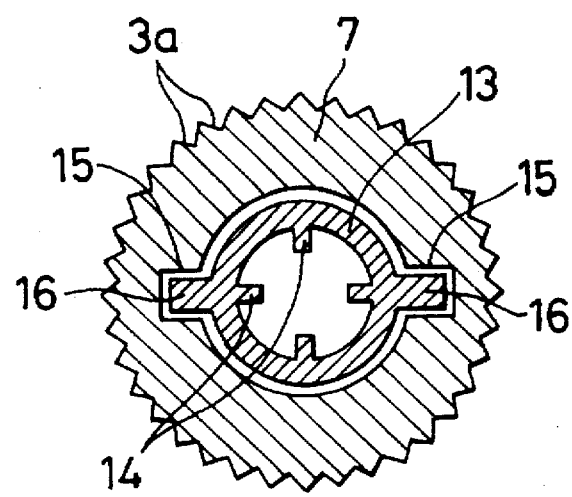
FIG. 2 is a horizontal sectional view showing the relation between the power transmitting member and the ribbon take-up gear.
Figure 3:
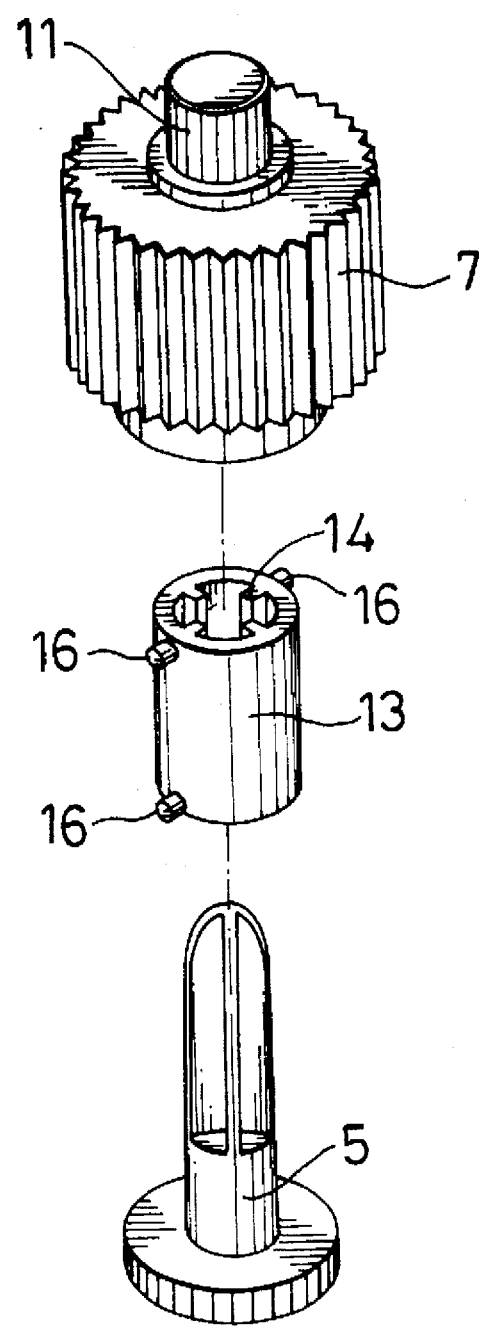
FIG. 3 is an exploded perspective view showing the relation between the ribbon driving shaft, the power transmitting member, and the ribbon take-up gear.
Figure 7:
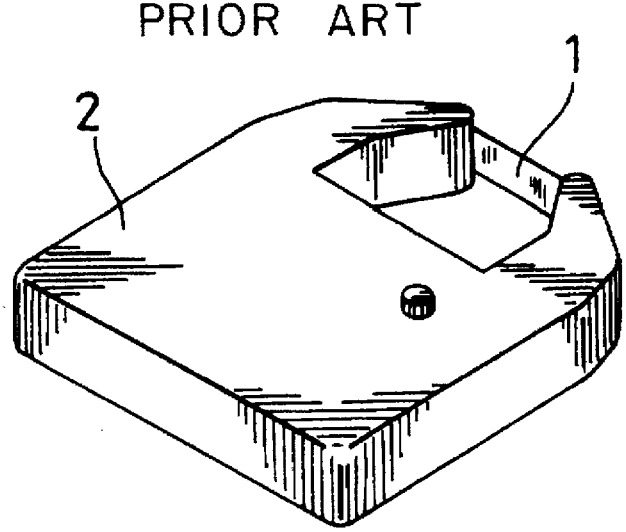
FIG. 7 is a perspective view showing the appearance of a ribbon cassette in the prior art.
Figure 8:
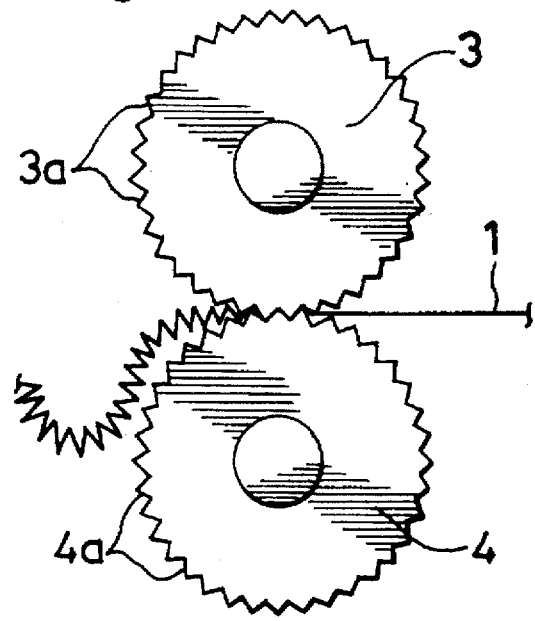
FIG. 8 is a plan view of a part of the ribbon cassette shown in FIG. 7, showing ink ribbon take-up operation.
Figure 9:
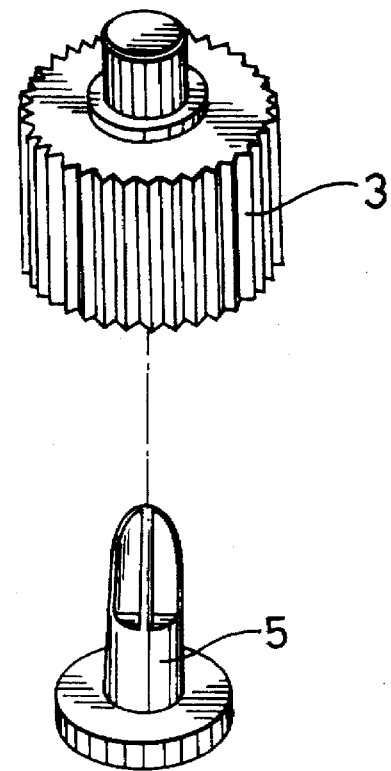
FIG. 9 is an exploded perspective view showing the relation between a ribbon take-up gear and a ribbon driving shaft in the prior art.

A first preferred embodiment of the present invention will now be described with reference to FIGS. 1 to 3. The same parts as those described with reference to FIGS. 7 to 9 will be denoted by the same reference numerals, and the description thereof will be hereinafter omitted (ditto for other preferred embodiments). FIG. 1 is a vertical sectional view showing a part of a cassette case 2. A bottom portion 6 of the cassette case 2 is formed with a recessed portion 8 for rotatably supporting the lower end of a ribbon take-up gear 7 having a plurality of teeth 3a over the outer circumference, and with a through-hole 9 formed at the center of the recessed portion 8 for allowing insertion of a ribbon driving shaft 5 provided in a printer. Further, a cover 10 of the cassette case 2 is formed with a through-hole 12 from which a knob 11 formed at the upper end of the ribbon take-up gear 7 projects.

The ribbon take-up gear 7 is provided with a power transmitting member 13 adapted to be driven by the ribbon driving shaft 5. The power transmitting member 13 has a hollow cylindrical shape opened at the opposite ends. The inner circumference of the power transmitting member 13 is integrally formed with a plurality of ribs 14 as the engaging portion in the present invention adapted to be engaged with the ribbon driving shaft 5 having a cross-shaped section at its head portion like a screwdriver as a tool. The outer circumference of the power transmitting member 13 is integrally formed at its opposite ends with a plurality of projections 16 as the connecting portion in the present invention adapted to be selectively connected with a pair of opposed grooves 15 formed on the inner circumference of the ribbon take-up gear 7. Each of the projections 16 is a pin-like member having a diameter of 0.1 mm and a length of 0.8 mm. Thus, the ribs 14 and the projections 16 are integral with the power transmitting member 13. The strength of each projection 16 is set to such a degree that when a load corresponding to that upon occurrence of ribbon jam is applied to the ribbon take-up gear 7, the projections 16 engaged with the grooves 15 break. That is, letting t denote a rotating torque of the ribbon take-up gear 7 usually required to travel an ink ribbon 1, T denote a torque (∞) to rotate the ribbon take-up gear 7 upon occurrence of ribbon jam, T1 denote a breaking torque of each projection 16 of the power transmitting member 13, and T2 denote a breaking torque of the ribbon driving shaft 5 in the printer, the conditions of t<T1<T2 and T>T1<T2 are set.

More specifically, the power transmitting member 13 integrally formed with the ribs 14 and the projections 16 is an integrally-molded member of polyacetal. The ribbon take-up gear 7 is also formed of polyacetal. The ribbon driving shaft 5 in the printer is formed of polybutylene terephthalate. The rotating torque t of the ribbon take-up gear 7 usually required to travel the ink ribbon 1 is set to 120 gfcm. The breaking torque T1 of each projection 16 of the power transmitting member 13 is set to 1050 gfcm. The breaking torque T2 of the ribbon driving shaft 5 in the printer is set to 3300 gfcm. Accordingly, the torque (∞) T to rotate the ribbon take-up gear 7 upon occurrence of ribbon jam satisfies the relation of T> 1050 (gfcm)<3300 (gfcm).

In operation, when the cassette case 2 is set in the printer, the power transmitting member 13 is connected to the ribbon driving shaft 5. When the ribbon driving shaft 5 is driven in this condition, the power transmitting member 13 is rotated. In the normal condition where no ribbon jam occurs, the rotation of the power transmitting member 13 is transmitted to the ribbon take-up gear 7 by the engagement of the grooves 15 and the projections 16 in accordance with the above-mentioned relation of t<T1<T2. As a result, the ink ribbon 1 is traveled.

In the event that ribbon jam occurs because of any trouble such as crumpling of the ink ribbon 1 in the cassette case 2, the projections 16 engaged with the grooves 15 break in accordance with the above-mentioned relation of T>T1<T2. Although the frequency of occurrence of ribbon jam causing the break of the power transmitting member 13 is not so large, this break can be handled by replacing the ribbon cassette as a consumable article. Accordingly, the troublesome work of replacing the ribbon driving shaft 5 in the printer can be eliminated, and a cost required for maintenance can also be eliminated.

In this preferred embodiment, of all the projections 16 of the power transmitting member 13, only the two projections 16 formed at one of the power transmitting member 13 on its outer circumferential surface are engaged with the two grooves 15 as shown in FIG. 1. Accordingly, in the event that the projections 16 engaged with the grooves 15 break, the other projections 16 formed at the other end of the power transmitting member 13 on its outer circumferential surface can be used in the following manner. That is, the cover 10 of the cassette case 2 is first opened, and the power transmitting member 13 is next removed from the ribbon take-up gear 7. Then, the power transmitting member 13 is overturned to be inserted again into the ribbon take-up gear 7. That is, the other projections 16 instead of the broken projections 16 are now engaged with the grooves 15 of the ribbon take-up gear 7. Thus, the power transmitting member 13 can be reused. It is possible to carry out this operation in the state of removing the ribbon take-up gear 7 from the cassette case 2.

While the power transmitting member 13 is an independent member in the above preferred embodiment, it may be formed integrally with the ribbon take-up gear 7. For example, the engaging portion to be engaged with the ribbon driving shaft 5 may be projectingly formed integrally with the inner circumference of the ribbon take-up gear 7. In this case, the engaging portion formed integrally with the inner circumference of the ribbon take-up gear 7 functions also as the connecting portion to be connected to the ribbon take-up gear 7. It is needless to say that the strength of the engaging portion functioning also as the connecting portion must be set to a strength such that it breaks upon occurrence of ribbon jam.

Further, the power transmitting member 13 may have a structure such that when a high load is applied to the ribbon take-up gear 7, any members having the function of the ribs 14 break rather than the projections 16. For example, such members corresponding to the ribs 14 may be formed as pin-like members having a relatively low strength. Alternatively, the members breaking upon application of a high load to the ribbon take-up gear 7 may be both the members corresponding to the ribs 14 and the projections 16.

Figure 4:
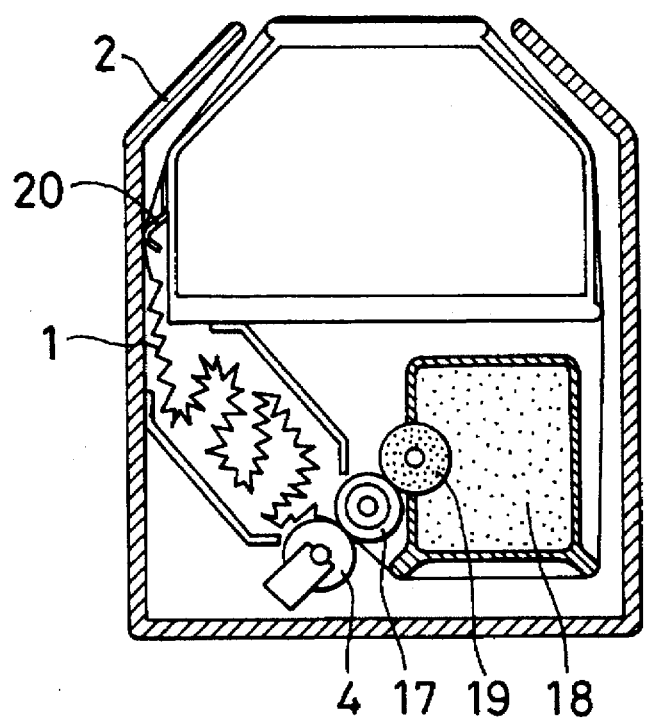
FIG. 4 is a plan view showing the interior of a cassette case in a second preferred embodiment of the present invention.

A second preferred embodiment of the present invention will now be described with reference to FIGS. 4 to 6. As shown in FIG. 4, a driven gear 4 and a ribbon take-up gear 17 are rotatably provided in a cassette case 2, and an ink tank 18 is also provided in the cassette case 2. The ink tank 18 is provided with an ink roller 19 for supplying ink to the ribbon take-up gear 17. The ink tank 18 contains a sponge or the like impregnated with the ink. Further, a leaf spring 20 abutting against an ink ribbon 1 in a ribbon traveling path is provided in the cassette case 2, so as to apply a tension to the ink ribbon 1 to be drawn from the cassette case 2 when the ink ribbon 1 is taken up by the ribbon take-up gear 17 and the driven gear 4.

Figure 5:
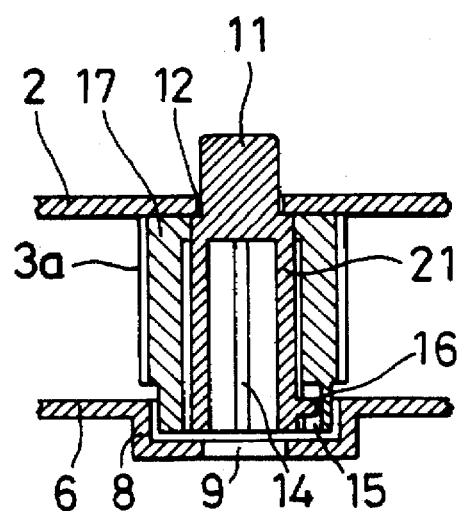
FIG. 5 is a vertical sectional view showing the relation between a power transmitting member and a ribbon take-up gear in the second preferred embodiment.
Figure 6:
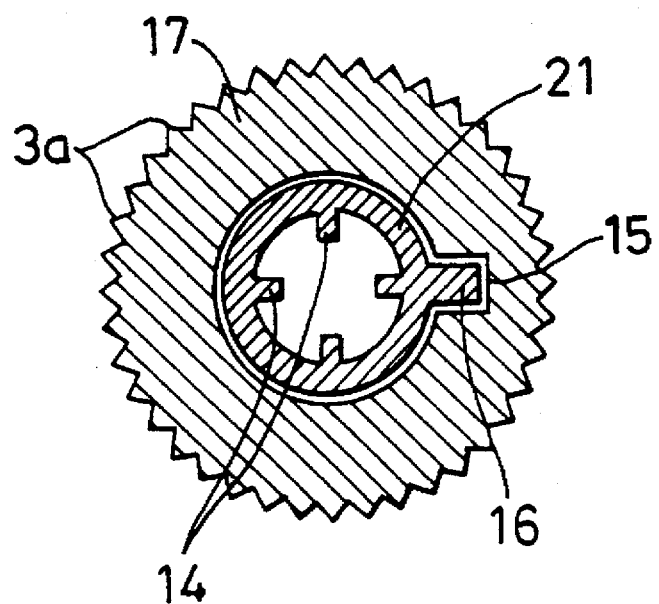
FIG. 6 is a horizontal sectional view showing the relation between the power transmitting member and the ribbon take-up gear shown in FIG. 5.

As shown in FIGS. 5 and 6, a power transmitting member 21 in the second preferred embodiment has a plurality of ribs 14 adapted to be engaged with a ribbon driving shaft 5 provided in a printer, a projection 16 engaged with a groove 15 formed on the inner circumference of the ribbon take-up gear 17, and a knob 11 inserted through the ribbon take-up gear 17 and projecting from a through-hole 12 of the cassette case 2.

In operation, when the cassette case 2 is set in the printer and the ribbon driving shaft is driven, the power transmitting member 21 is rotated. In the event that ribbons jam occurs because of any trouble such as crumpling of the ink ribbon 1 in the cassette case 2, the projection 16 of the power transmitting member 21 breaks.

The ribbon cassette according to the present invention may be of any types including the type where it is detachably set on a carriage on which a print head is mounted and the type where it is detachably fixed to any portion of a printer other than the carriage.

What is claimed is:

1. A ribbon cassette for use with a printer, comprising:
    a cassette case adapted to be detachably mounted in said printer;
    an ink ribbon stored in said cassette case and partially exposed to face a print head provided in said printer;
    a ribbon take-up member rotatably supported in said cassette case;
    a driven member rotatably supported in said cassette case and meshing with said ribbon take-up member through said ink ribbon; and
    a power transmitting member provided in said ribbon take-up member to connect said ribbon take-up member to a ribbon driving shaft provided in said printer, a breaking strength of said power transmitting member against a load from said ink ribbon being set smaller than that of said ribbon driving shaft, said power transmitting member having a connecting portion including at least one radially extending projection connected with said ribbon take-up member and an engaging portion including at least one axially extending rib for engaging with said ribbon driving shaft.

2. A ribbon cassette as recited in claim 1, wherein said power transmitting member is formed independently of said ribbon take-up member.

3. A ribbon cassette as recited in claim 2, wherein a breaking strength of said connecting portion against the load from said ink ribbon is set smaller than that of said ribbon driving shaft.

4. A ribbon cassette as recited in claim 2, wherein a breaking strength of said engaging portion against the load from said ink ribbon is set smaller than that of said ribbon driving shaft.

5. A ribbon cassette as recited in claim 2, wherein said power transmitting member is removable from said ribbon take-up member in an axial direction thereof.

6. A ribbon cassette as recited in claim 1, wherein said power transmitting member is formed integrally with said ribbon take-up member.

7. A ribbon cassette for use with a printer, comprising:
    a cassette case adapted to be detachably mounted in said printer;
    an ink ribbon stored in said cassette case and partially exposed to face a print head provided in said printer;
    a ribbon take-up member rotatably supported in said cassette case;
    a driven member rotatably supported in said cassette case and meshing with said ribbon take-up member through said ink ribbon; and
    a power transmitting member provided in said ribbon take-up member to connect said ribbon take-up member to a ribbon driving shaft provided in said printer, a breaking strength of said power transmitting member against a load from said ink ribbon being set smaller than that of said ribbon driving shaft, said power transmitting member having a connecting portion connected with said ribbon take-up member and an engaging portion for engaging with said ribbon driving shaft;
    said connecting portion of said power transmitting member having two connecting portions axially spaced from each other, one of said two connecting portions being connected with said ribbon take-up member when said power transmitting member is properly mounted on said ribbon take-up member.

* * * * *

UNITED STATES PATENT AND TRADEMARK OFFICE
CERTIFICATE OF CORRECTION

PATENT NO. :  5,738,448
DATED       :  April 14, 1998
INVENTOR(S) :  Kozo HARA, et al.

It is certified that error appears in the above-identified patent and that said Letters Patent is hereby corrected as shown below:

On the title page Item [73], the assignee, is incorrect. It should read:

--Kabushiki Kaisha TEC, Shizuoka, Japan--

Signed and Sealed this

Twenty-second Day of December, 1998

Attest:

BRUCE LEHMAN

*Attesting Officer*        *Commissioner of Patents and Trademarks*